United States Patent [19]

Schiller

[11] Patent Number: 4,741,825

[45] Date of Patent: May 3, 1988

[54] MOBILE VORTEX SHIELD

[75] Inventor: Alan G. Schiller, Arlington, Minn.

[73] Assignee: Aeration Industries, Inc., Chaska, Minn.

[21] Appl. No.: 70,143

[22] Filed: Jul. 2, 1987

Related U.S. Application Data

[63] Continuation of Ser. No. 810,172, Dec. 18, 1985, abandoned.

[51] Int. Cl.⁴ .......... C02F 7/00; B01F 3/04

[52] U.S. Cl. .......... 210/170; 210/219; 210/220; 210/242.2; 261/87; 261/120

[58] Field of Search .......... 210/170, 219, 220, 242.2; 261/87, 93, 120, 123; 366/102, 147; 415/8, 102; 417/367, 424

[56] References Cited

U.S. PATENT DOCUMENTS

| | | | |
|---|---|---|---|
| 1,632,758 | 6/1927 | Fulweiler | 261/87 |
| 3,191,394 | 6/1965 | Avery | 261/120 |
| 3,193,260 | 7/1965 | Lamb | 210/220 |
| 3,794,303 | 2/1974 | Hirshon | 261/120 |
| 4,193,951 | 3/1980 | Stanley | 261/120 |
| 4,240,990 | 12/1980 | Inhofer et al. | 261/87 |
| 4,268,398 | 5/1981 | Shuck | 261/120 |

FOREIGN PATENT DOCUMENTS

| | | | |
|---|---|---|---|
| 2543681 | 4/1977 | Fed. Rep. of Germany | 210/220 |
| 2398024 | 3/1979 | France | 210/220 |

OTHER PUBLICATIONS

Hitachi Sparotor Brochure.

Aeration Aire-$O_2$ Aerator Mounting Options Guide.

Boyd, *New Aeration Tests May Provide Better Basis for Comparison,* Aquaculture Magazine, (May-Jun. 1982).

*Primary Examiner*—Ernest G. Therkorn

*Attorney, Agent, or Firm*—Banner, Birch, McKie & Beckett

[57] ABSTRACT

An apparatus for use with propeller type aspirating aerators for preventing the formation of vortices near an aerator propeller in a substance in which the propeller is driven. The device comprises a mobile floatable shield which floats on the aerated substance and eliminates a vortex by being drawn into one by the vortex's own swirling motion and contacting the vortex. The shield may be flexibly attached to a frame which also houses the aerator. Because the shield is not connected to the aerator, floats on the surface and is mobile, many of the problems faced with the prior art devices have been eliminated: the shield is easier and cheaper to manufacture; material does not wedge between the aerator and the shield; any problems with the shield are visible; the shield stops virtually all vortices; and vibration problems are eliminated.

16 Claims, 5 Drawing Sheets

14
12
10
28
26
24
16
26
32
30
22
18
20

10
12
14
16
18
20
22
24
24
26
26
26
26
26
28
28
28
28
28
30
32
32
32

22
22
28
28
26
26
28
16
32
18
30B
20
22
28
32
22
26
26
28

MOBILE VORTEX SHIELD

This is a continuation of application Ser. No. 810,172, filed Dec. 18, 1985, now abandoned.

TECHNICAL FIELD

The present invention relates to an apparatus used during an aeration process. More particularity, the present invention relates to an apparatus for preventing vortices in an aerated substance.

BACKGROUND OF THE INVENTION

In biological purification of waste waters which contain organic solids, sediments are formed which are so firm that anaerobic zones occur within them. This leads to the creation of offensive odors and sedimentation. Dissolved oxygen is required to prevent the formation of these offensive odors and to biologically break down the organic matter within the water. Moreover, a certain amount of dissolved oxygen is required to sustain various aquatic organisms. Increasing the dissolved oxygen content of other substances, such as sludge, is also necessary.

Aeration apparatus are used to increase the dissolved oxygen content of the treated substance and thereby purify it. One type of aeration apparatus is a propeller aspirator aerator. These devices use an electric motor driven rotating propeller disposed below the surface of the substance being treated. The propeller draws in atmospheric air from an intake port through a draft tube and discharges it into the substance.

As is apt to happen with subsurface propeller-type devices, vortices are created, In the context of an aeration apparatus, vortices are undesirable as they decrease the speed and efficiency of operation. To combat this problem vortex shields have been developed for aerators. These shields prevent the formation of vortices adjacent the propeller in the substance in which the propeller is driven. In prior art embodiments of vortex shields, the shield is rigidly affixed to the aerator so as to reside, in part, above the aerator propeller when the aerator is in operation. These shields are either flat or curved around the aerator shaft.

These prior known devices have a number of disadvantages, all of which are alleviated and eliminated by the present invention. The rigidly affixed vortex shields catch material which floats in the water. Since the shields are disposed under the surface of the water, it is difficult, if not impossible to locate any problems with the shield. The shields also are not able to eliminate every vortex created. Often a vortex forms in a non-vertical direction and evades the vortex shield. Also when a vortex escapes the shield it sometimes vibrates the shield and tears it off. The mobile vortex shield disclosed below solves these problems.

SUMMARY OF THE INVENTION

The present invention is directed to a mobile vortex shield which contacts and eliminates vortices created by an aerator. The shield floats on the surface of the aerated substance and is connected to a support structure by flexible, elongate members which allow the shield to float over a defined surface area of the aerated substance above the aerator's propeller. Thus, the shield may follow a vortex until it intercepts and eliminates it.

Propeller-type aerators can range in size, for example, from ½ hp to 100 hp. As the size of the aerator increases, the size of its support system likewise increases. The present invention preferably uses a common shield support and aerator support, so that the type of shield support is dependent on the aerator size. The type of support system also depends on the type and size of the aerated substance container (e.g., basin, lagoon, or tank). In the preferred embodiment the support system for the vortex shield will comprise a slightly modified version of the basic aerator support system. For the smaller aerators, additional support members may be used to center the vortex shield over the aerator propeller. For larger applications the vortex shield attachment members can be attached directly to the vertical and/or horizontal supports of the aerator without modification.

The shields mobility allows it to eliminate all vortices—not just those forming immediately above the aerator propeller. As the shield floats on the surface of the aerated substance it will not catch any floating material and trap it near the propeller. Nor are any problems hidden from observation. Finally, no vortices will be capable of vibrating the shield and tearing it from its mooring as the shield is flexibly attached to the frame. Also, any vibrating will have no adverse effect on the performance of the aerator as the shield is not connected to the aerator.

Various advantages and features of novelty which characterize the invention are further pointed out in the claims that follow. However, for a better understanding of the invention and its advantages reference should be had to the accompanying drawings and descriptive matter which illustrate and describe preferred embodiments of the invention.

DETAILED DESCRIPTION OF THE INVENTION

Figure 1:
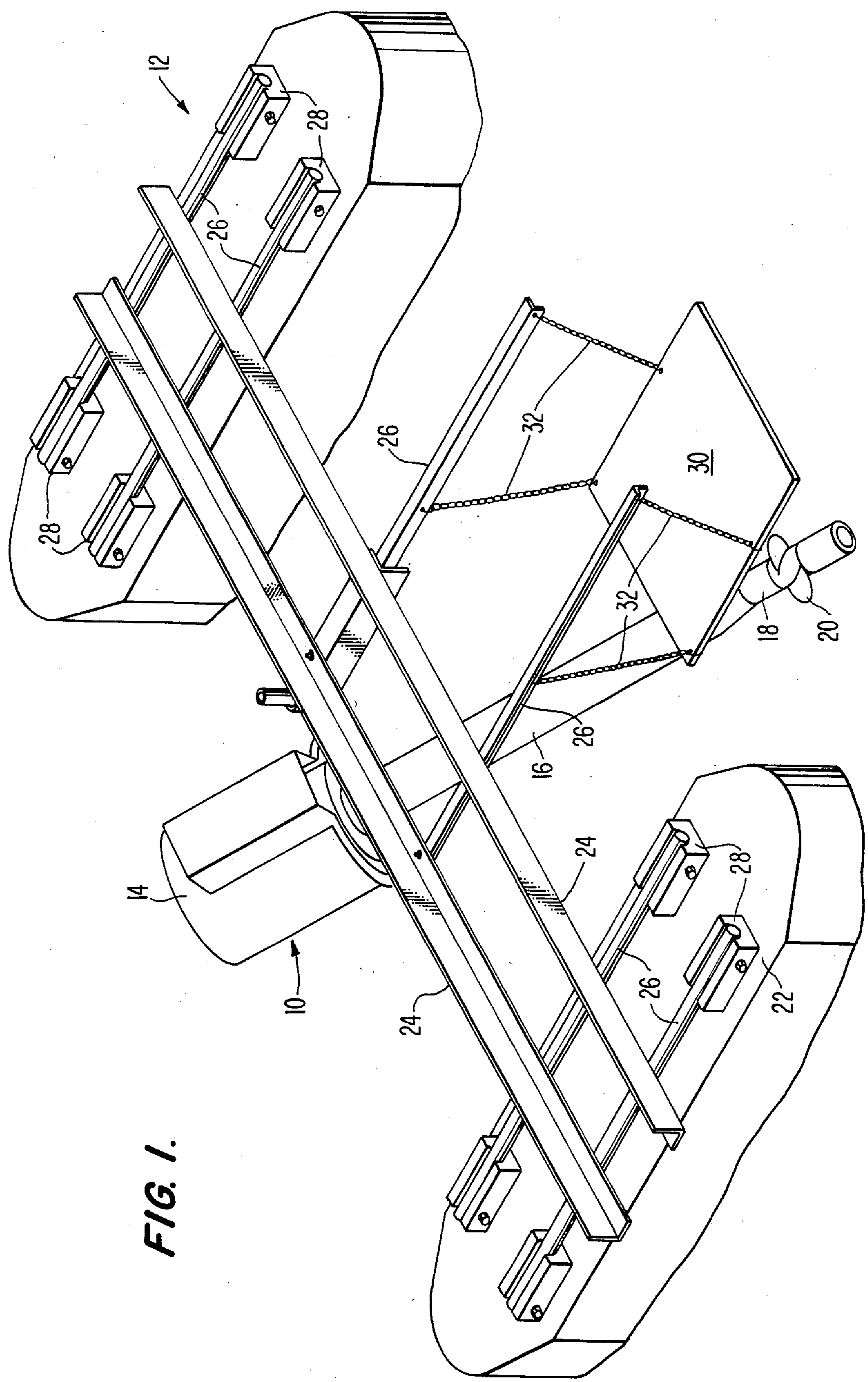
FIGS. 1 through 3 are perspective views illustrating various sized float-supported vortex shields and aerators in accordance with the present invention.

Referring to the drawings in detail, wherein like numerals indicate like elements, FIG. 1 shows an apparatus according to the present invention. A propeller-type aspirating aerator 10 is attached to a support system 12. Aerator 10 comprises a motor 14 attached to an outer housing 16. Motor 14 is drivingly coupled to tube 18 which extends through the interior of housing 16 and out of its lower end. A propeller 20 is attached to the lower end of tube 18. When motor 14 rotates tube 18, propeller 20 drives the liquid surrounding it, thereby aspirating air down tube 18 and into the liquid. Aerator 10, illustrated in FIG. 1, is a relatively small aerator, for example, a 2 to 7½ horsepower aerator.

Support system 12 is a floatation type system wherein a pair of floats 22 float on the liquid being aerated. Floats 22 function as vertical supports, i.e., providing support vertically above the surface of the liquid. A pair of horizontal support bars 24 are connected to floats 22 by mounting bars 26 carried in bar rests 28 on the upper surface of floats 22. Support bars 24 extend horizontally between floats 22 to function as a first horizontal support which positions aerator 10 at a desired horizontal location (preferably centrally) between floats 22. Another pair of support bars 26 extends perpendicularly from bars 24 to function as a second horizontal support which positions a vortex shield 30 at a desired horizontal location over propeller 20. Vortex shield 30 should be of lightweight construction so as to float on the aerated substance on which it rests. It should also be chemically inert, biologically nondegradeable and insoluble in the substance being aerated. A low-density polypropylene is recommended. Vortex shield 30 is flexibly attached to support bars 26 by four flexible attachment members 32, such as chains attached at their ends by hooks to vortex shield 30 and support bars 26. Support bars 26 center vortex shield 30 over the propeller 20 of the aerator 10.

Vortex shield 30 prevents the formation of a vortex adjacent the propeller 20 in the substance being aerated. Since shield 30 floats on the surface of the aerated substance, it is drawn to any vortices that form because the vortex pulls shield 30, along with other material in the vicinity, towards itself. When shield 30 contacts the vortex it eliminates it. Vortex shield 30 is free to follow vortices as it is not rigidly attached to the aerator. Rather, it is flexibly attached to support system 12 by a sufficient length of flexible attachment members that permit it to float over an area large enough to encompass all propeller-created vortices. When contacting a vortex, shield 30 will not vibrate and/or damage aerator 10 because it is not rigidly affixed to aerator 10.

The remaining Figures illustrate vortex shields used with different types of support systems and/or different sized aerators. Common elements of the support system and aerators will identify with the same numerals and the vortex shield will be identified by a like numeral and a letter suffix.

Figure 2:
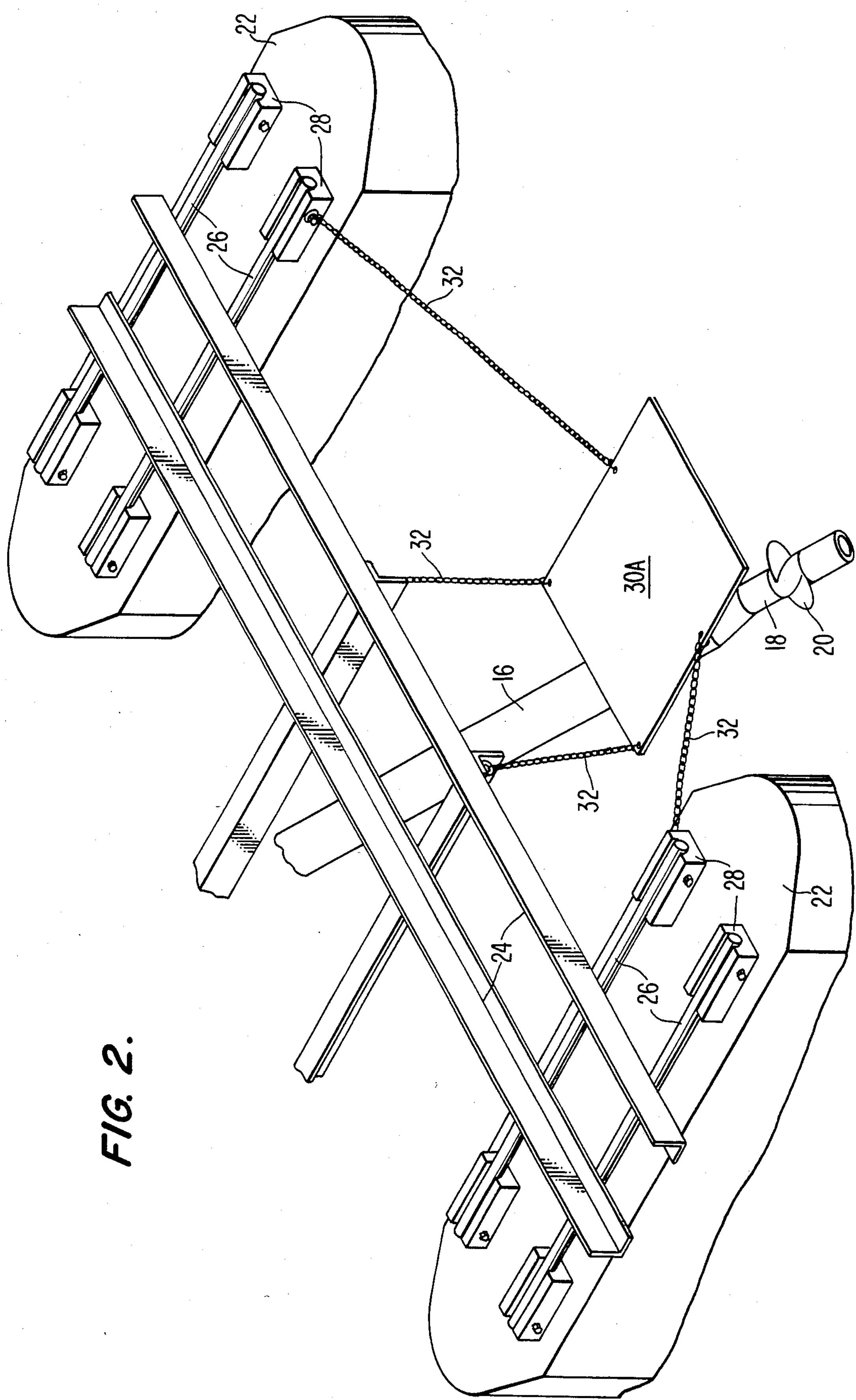
Figure 4:
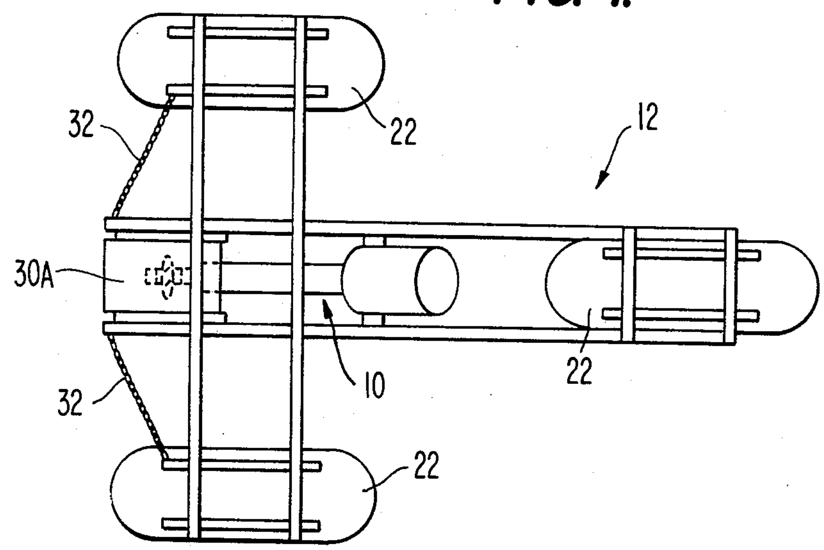
FIG. 4 is a simplified view of the vortex shield and aerator of FIG. 2.

FIGS. 2 and 4 show a medium sized aerator 10, e.g. 10 to 30 horsepower, carried on a floatation type support system 12. As shown in FIG. 4, three floats 22 are used. Because of the placement of aerator 10 relative to support system 12, it is not necessary to use the second horizontal support of support bars 26 to position vortex shield 30A over propeller 20. Shield 30 is supported by the flexible attachment members 32, two of which are fastened to one of the horizontal support bars 24 and two of which are fastened directly to one of the mounting bar rests 28 on floats 22 which comprise vertical supports for support system 12. The function and characteristics of vortex shield 30A remains the same.

Figure 3:
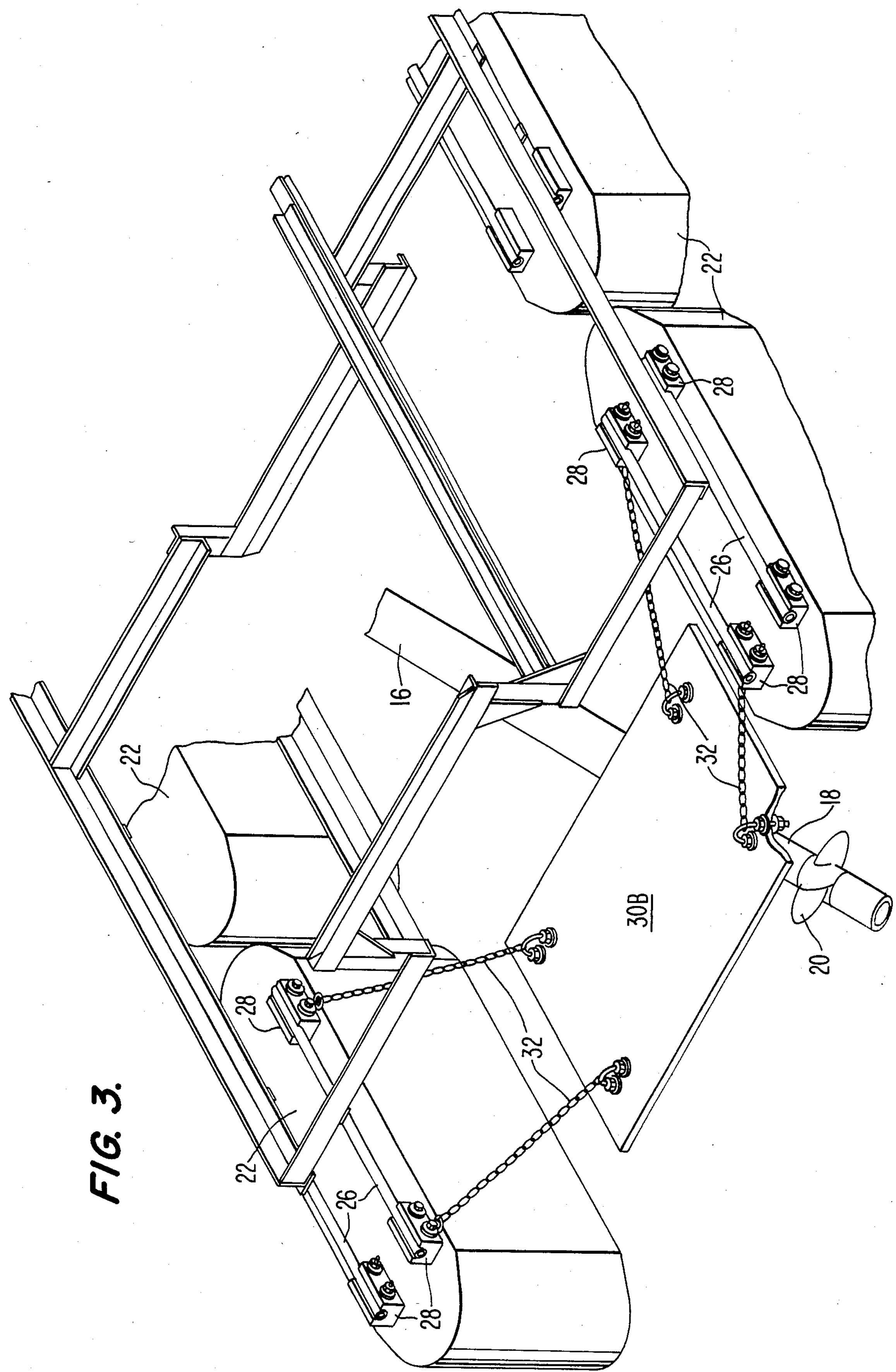
Figure 5:
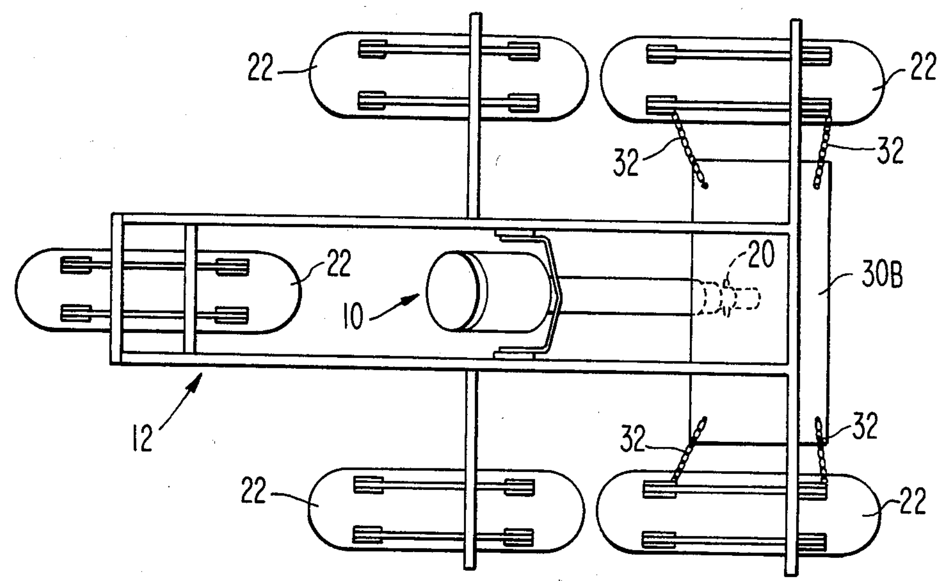
FIG. 5 is a simplified plan view of the vortex shield and aerator of FIG. 3.

FIGS. 3 and 5 illustrate a large sized aerator 10, e.g., 40 to 100 horsepower carried on a floatation-type support system 12. In this embodiment the vertical supports comprise floats in order to accommodate the large aerator. As seen in FIG. 5, five floats are used to carry the large sized aerator 10. In this embodiment, flexible attachment members 32 which support vortex shield 30B, are all connected directly to mounting bar rests 28 on floats 22.

Figure 6:
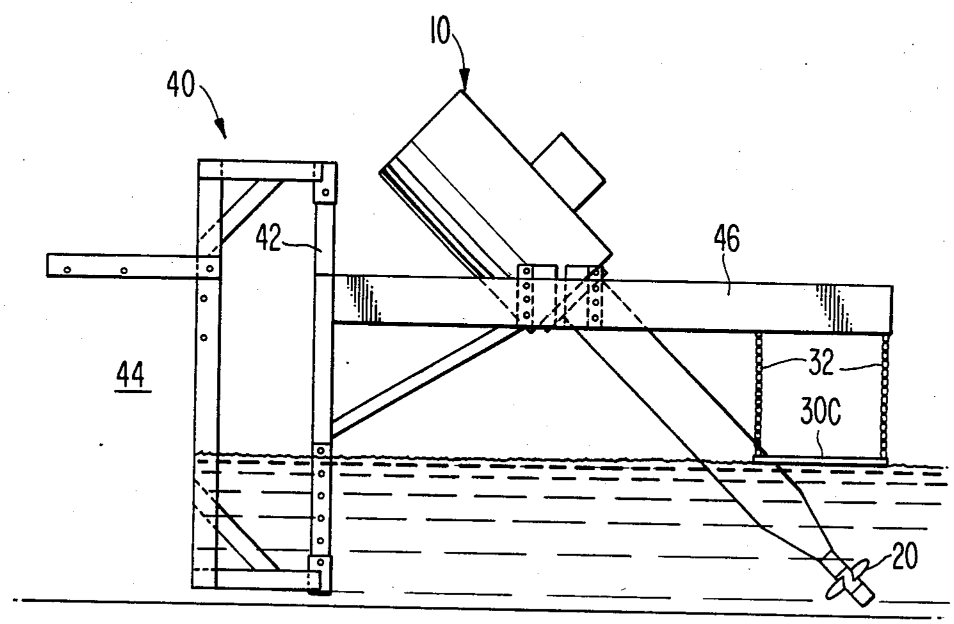
FIG. 6 is a side view of a wall-mounted vortex shield and aerator.

FIG. 6 illustrates a medium sized aerator 10 carried on a wall mount support system 40 instead of a floatation system. In this configuration the vertical support comprises a vertically extending framework 42 mounted on a wall 44 of the aeration tank. The horizontal support includes a pair of horizontally extending support bars 46 (one of which is shown in FIG. 6) oriented parallel to the axis of the aerator instead of perpendicular to it. Vortex shield 30C and aerator 10 are both carried by support bars 46.

Figure 7:
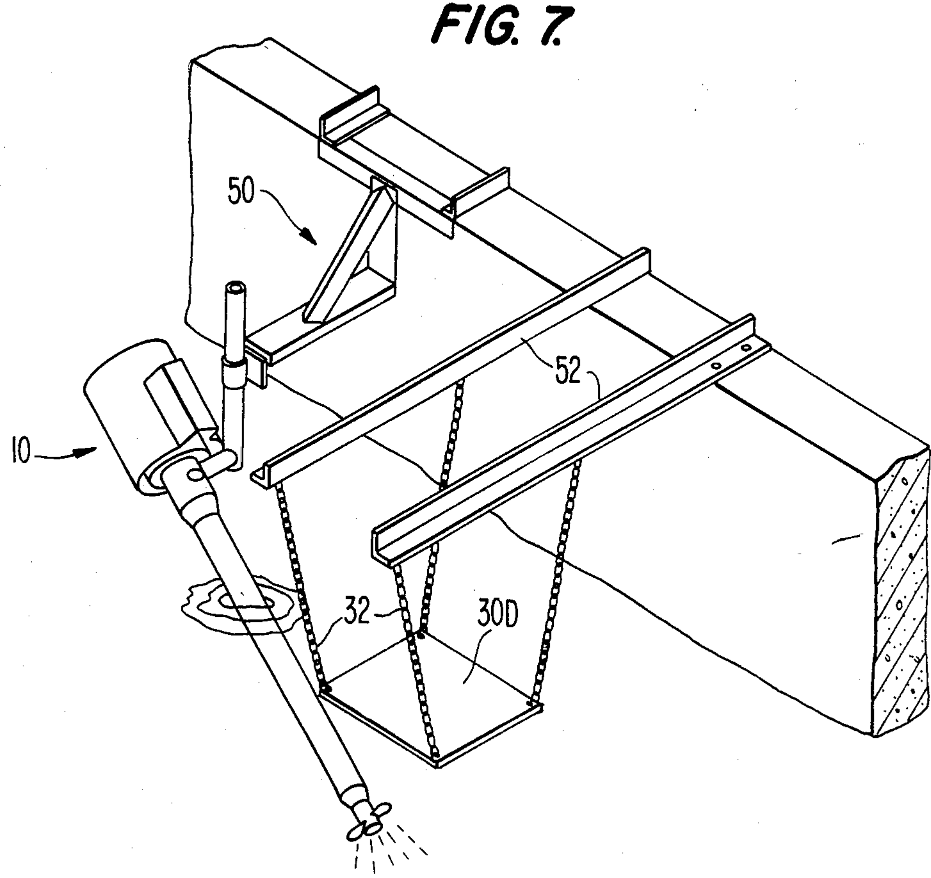
FIG. 7 is a perspective view of an additional embodiment of a wall-mounted vortex shield and aerator.

FIG. 7 shows small sized aerator 10 supported on a wall mount 50. Vortex shield 30D is attached by flexible attachment members 32 to a pair of horizontal support bars 52 extending from the vertical wall. The horizontal support bars 52 are separate from wall mount 50 supporting aerator 10.

Numerous characteristics and advantages of the invention have been set forth in the foregoing description together with details of the structure and function of the invention, and the novel features thereof are pointed out in the appended claims. The disclosure, however, is illustrative only, and changes may be made in detail especially in matters of shape, size and arrangement of parts, within the principle of the invention, to the full extent extended by the broad general meaning of the terms in which the appended claims are expressed.

I claim:

1. A mobile vortex shield apparatus for use with a propeller type aspirating aerator, for preventing the formation of vortices near the aerator propeller in a substance in which the propeller is driven comprising:
   - a support system for supporting the propeller type aspirating aerator;
   - a floatable shield which floats on the surface of the aerated substance, said floatable shield being separate from the aerator and flexibly connected to said support system to be moveable on the surface of the aerated substance relative to the aerator and said support system; and
   - at least one flexible elongated member attaching said floatable shield to said support system to enable said floatable shield to float freely on the substance within a defined area over the propeller of the aerator and relative to the propeller such that said floatable shield will contact and eliminate all vortices created by the aerator propeller by being drawn towards a vortex by the vortex's own swirling motion.

2. A mobile vortex shield in accordance with claim 1 wherein said flexible elongated member comprises a chain and connecting hooks.

3. A aeration apparatus comprising:
   - a propeller type aspirating aerator for inducing the flow of atmospheric air at high velocity below the surface of a substance so as to allow oxygen to freely and quickly transfer into the substance;
   - a support system for supporting the propeller type aspirating aerator;
   - a floatable shield which floats on the surface of the aerated substance, said floatable shield being separate from the aerator and flexibly connected to said support system to be moveable on the surface of the aerated substance relative to the aerator and said support system; and
   - flexible elongated members attaching said floatable shield to said support system so as to enable said floatable shield to float freely on the aerated substance within a defined area over the propeller of aerator such that said floatable shield will contact and eliminate all vortices created by the aerator propeller by being drawn towards a vortex by the vortex's own swirling motion.

4. An apparatus in accordance with claim 1 or 3 wherein said support system comprises
   - at least one vertical support and at least one first horizontal support attached to said vertical support and extending from said vertical support in a first direction.

5. An apparatus in accordance with claim 4 wherein said support system further comprises at least one second horizontal support attached to said first horizontal support and extending transversely therefrom.

6. An apparatus in accordance with claim 5 wherein said flexible elongated member is flexibly attached to said second horizontal support.

7. A mobile vortex shield in accordance with claim 5 wherein said at least one flexible elongated member comprises a plurality of flexible elongated members all of which are flexibly attached to said second horizontal support.

8. An apparatus in accordance with claim 7 wherein said support system is a floatation system and said vertical support includes at least two floats spaced from one another, said first horizontal support includes at least one support bar extending between said floats for supporting the aerator between said floats, and said second horizontal support includes at least one other support bar extending transversely from said first mentioned support bar in the area for supporting the aerator.

9. An apparatus in accordance with claim 8 wherein said support system is a floatation system and said vertical support includes at least two floats spaced from one another, and said first horizontal support includes at least one support bar extending between said floats.

10. An apparatus in accordance with claim 4 wherein said flexible elongated member is flexibly attached to said first horizontal support.

11. An apparatus in accordance with claim 4 wherein said flexible elongated member is flexibly attached to said vertical support.

12. An apparatus in accordance with claim 4 wherein said at least one flexible elongated member comprises a plurality of flexible elongated members at least one of which is flexibly attached to said first horizontal support and at least one of which is flexibly attached to said vertical support.

13. An apparatus in accordance with claim 12 wherein said support system is a floatation system and said vertical support includes at least two floats spaced from one another, and said first horizontal support includes at least one support bar extending between said floats.

14. A mobile vortex shield in accordance with claim 4 wherein said at least one flexible elongated member comprises a plurality of flexible elongated members all of which are flexibly attached to said vertical support.

15. An apparatus in accordance with claim 4 wherein said support system is a wall mount system, said vertical support including the wall and said horizontal support including at least one support bar extending from said wall for supporting both the aerator and said shield.

16. An apparatus in accordance with claim 4 wherein said support system is a wall mount system, said vertical support including the wall, and said horizontal support including at least one first support bar extending from the wall for supporting the aerator and at least one other separate support bar, extending from the wall for supporting said shield.

* * * * *